(12) United States Patent
Devereux

(10) Patent No.: US 10,871,371 B1
(45) Date of Patent: Dec. 22, 2020

(54) APPARATUS FOR ON-SITE MOUNTING OF SURVEYING INSTRUMENTS

(71) Applicant: Frank Devereux, Marietta, GA (US)

(72) Inventor: Frank Devereux, Marietta, GA (US)

( * ) Notice: Subject to any disclaimer, the term of this patent is extended or adjusted under 35 U.S.C. 154(b) by 0 days.

(21) Appl. No.: 16/695,942

(22) Filed: Nov. 26, 2019

(51) Int. Cl.
| | |
|---|---|
| *G01C 15/00* | (2006.01) |
| *F16M 11/00* | (2006.01) |
| *F16M 11/20* | (2006.01) |
| *F16M 11/32* | (2006.01) |
| *F16M 13/02* | (2006.01) |
| *G01C 1/02* | (2006.01) |
| *F16M 11/36* | (2006.01) |
| *F16M 11/04* | (2006.01) |
| *F16M 11/24* | (2006.01) |

(52) U.S. Cl.
CPC ............. *G01C 15/00* (2013.01); *F16M 13/02* (2013.01); *F16M 11/00* (2013.01); *F16M 11/041* (2013.01); *F16M 11/046* (2013.01); *F16M 11/247* (2013.01); *F16M 11/36* (2013.01); *G01C 1/02* (2013.01); *G01C 15/002* (2013.01)

(58) Field of Classification Search
CPC .......... G01C 15/00; G01C 15/06; G01C 1/02; G01C 15/002; F16M 11/041; F16M 11/2014; F16M 11/2021; F16M 11/2085; F16M 11/36; F16M 11/046; F16M 2200/066; F16M 13/02
USPC ....... 248/176.1, 176.3, 187.1, 163.1, 33/290, 33/293, 297
See application file for complete search history.

(56) References Cited

U.S. PATENT DOCUMENTS

| | | | | |
|---|---|---|---|---|
| 2,876,027 A | * | 3/1959 | Sulmonetti | F16B 2/10 403/53 |
| 2,984,443 A | * | 5/1961 | Bergengren | A47B 97/08 248/124.2 |
| 4,192,076 A | * | 3/1980 | Hall | F16M 11/046 248/163.1 |
| 4,290,207 A | * | 9/1981 | Browning | G01C 15/00 248/187.1 |
| 6,209,832 B1 | * | 4/2001 | Yamazaki | G01C 15/006 248/219.4 |
| 6,834,839 B1 | * | 12/2004 | Wilson | F16M 13/02 248/230.1 |
| 7,441,981 B2 | * | 10/2008 | Crain | E06C 7/14 248/124.1 |
| 8,162,557 B2 | * | 4/2012 | Van Zile, III | F16M 11/2035 403/96 |

(Continued)

*Primary Examiner* — Tan Le
(74) *Attorney, Agent, or Firm* — Law Offices of John G. Posa

(57) ABSTRACT

A kit or kits are disclosed for temporarily securing a surveying instrument such as a total station, theodolite, laser or laser target to an existing structure on a job site. A basic kit includes an arm assembly with an elongated rigid member with a mounting mechanism such as a tribrach mount on one end to receive and secure the surveying instrument to the arm assembly. Each kit further includes at least two clamps with an adjustable jaw configured to tighten each clamp onto a respective position along the elongated rigid member. Each clamp may include a jaw configured to tighten onto an existing rebar, a masonry wall anchor, or a bracket and ratcheting strap configured to secure the arm assembly to an existing upright column structure such as an I-beam. A kit may further include tools for installing, adjusting or leveling the assembly.

7 Claims, 5 Drawing Sheets

(56) References Cited

U.S. PATENT DOCUMENTS 9,958,759 B2 * 5/2018 Johnson, Sr. .......... F16M 11/10

* cited by examiner

APPARATUS FOR ON-SITE MOUNTING OF SURVEYING INSTRUMENTS

FIELD OF THE INVENTION

This invention relates generally to surveying and, in particular, to kits enabling surveying instruments to be mounted to existing structures on job sites.

BACKGROUND OF THE INVENTION

Modern surveying operations use various highly accurate and sensitive instruments to measure and map sites for building and construction projects. A theodolite, for example, uses a movable telescope to measure angles in both the horizontal and vertical planes. Manual versions of these instruments include the transit, which rotates in a full circle in the vertical plane, and non-transit versions, which rotate in a half-circle.

More recently, "total stations" combine electronic transit theodolites with a distance meter to read slope distance from the instrument to a target. When used with other technology such as mapping software, total stations are able to deliver a complete surveying solution from measuring to mapping, hence the term 'total.' Total stations may also include image capture capabilities to record aspects of the surveying site, thereby eliminating time-consuming revisits. For at least these reasons, total stations are replacing manual theodolites.

Total stations, theodolites, and other surveying instruments are conventionally mounted using a tribrach attachment mechanism on the top of a tripod, for example. A tribrach uses two triangular metal plates connected at their corners by leveling thumbscrews, a bubble level, a locking mechanism and often an optical plummet. The tribrach allows the survey instrument to be repeatedly placed in a desired position at high precision by loosening and re-tightening a lock to adjust the instrument base in a horizontal plane.

Tribrach mounting plates are typically provided on stable mounting platforms such as specialized tripods. However, there are times when the use of a tripod is either undesirable or inconvenient due to tight spaces or uneven terrain. At the same time, most construction sites already include mechanical structures such as columns which could serve as a mounting base for surveying equipment. There are, for example, "column clamps" that attach to vertical I-beams with straps to support theodolites, total stations, lasers, and the like. However, vertical I-beams are not already present on job sites, and strap mounting may be subject to loosening and/or vibration. The need remains, therefor, for a more versatile solution for on-site mounting of delicate and sensitive surveying instruments.

SUMMARY OF THE INVENTION

This invention provides a kit or kits for securing a surveying instrument to an existing structure on a job site. A basic kit according to the invention includes an arm assembly with an elongated rigid member defining a longitudinal axis, with first and second opposing ends defining a length. A mounting mechanism attached to one of the opposing first and second ends of the arm assembly is adapted to receive and secure a surveying instrument to the arm assembly. The surveying instrument may be a total station, theodolite, laser or laser target.

The kit further includes at least two clamps, each clamp having first and second portions. The first portion of each clamp includes an adjustable jaw configured to tighten each clamp onto a respective position along the elongated rigid member, and wherein the second portion of each clamp includes a device enabling the clamp to be rigidly fastened to an existing structure on a job site. The mounting mechanism preferably includes one portion of a tribrach mount associated with the surveying instrument.

The second portion of each clamp may include a jaw configured to tighten onto an existing rebar, a masonry wall anchor, or a bracket and ratcheting strap configured to secure the arm assembly to an existing upright column structure such as an I-beam. A kit may further include tools for installing, adjusting or leveling the assembly.

DETAILED DESCRIPTION OF THE PREFERRED EMBODIMENTS

Figure 1:
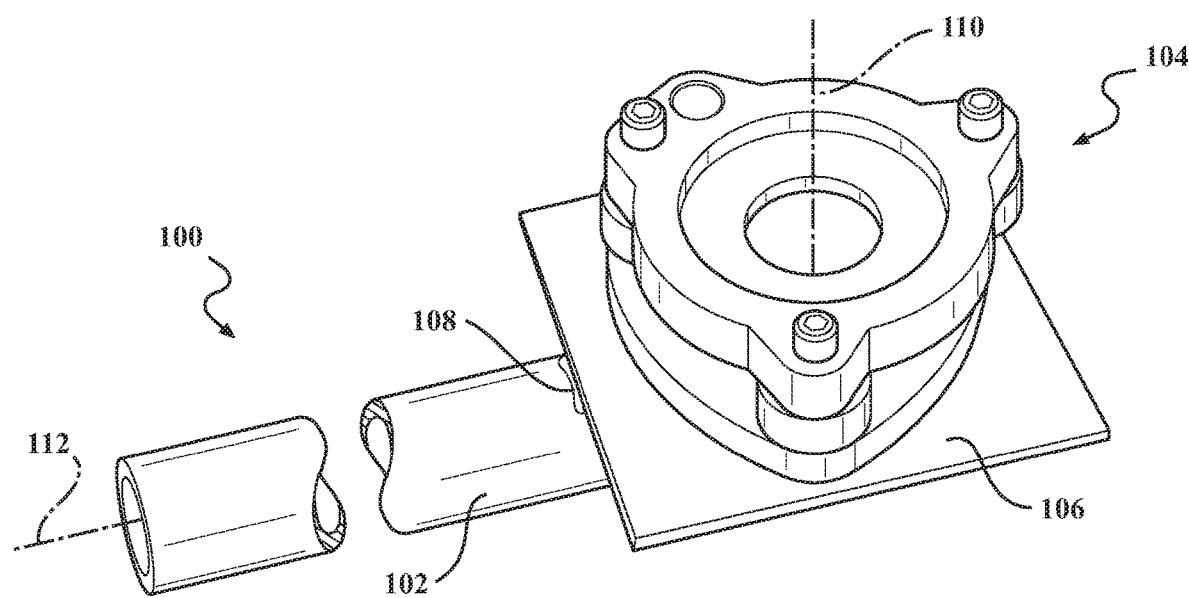
FIG. 1 is a drawing of a mounting arm constructed in accordance with the invention.

Now making reference to the accompanying drawing, FIG. 1 depicts a mounting arm assembly 100 constructed in accordance with the invention. The assembly 100 comprises a rigid member 102 having, a one end, a surveying instrument mount, preferably the lower portion of a tribrach mounting mechanism 104. The tribrach mounting mechanism may be secured to a mounting plate 106 which, in turn, is fastened to the rigid member 102 through welding 108 or other suitable technique. In the preferred embodiment, the axis 110 associated with the tribrach mount is substantially perpendicular to the longitudinal axis 112 of the rigid member 102.

Rigid member 102 may be of any suitable material, such as aluminum or steel, including stainless, and may have any appropriate cross-sectional geometry including circular, square, hexagonal, etc. In the preferred embodiment, member 102 is a rigid, cylindrical aluminum tube having a outer diameter (O.D.) in the range of ¾ to 2 inches, more preferably 1 to 1¼", and a length in the range of 2 to 6 feet, more preferably 3 to 4 feet in length.

Figure 2:
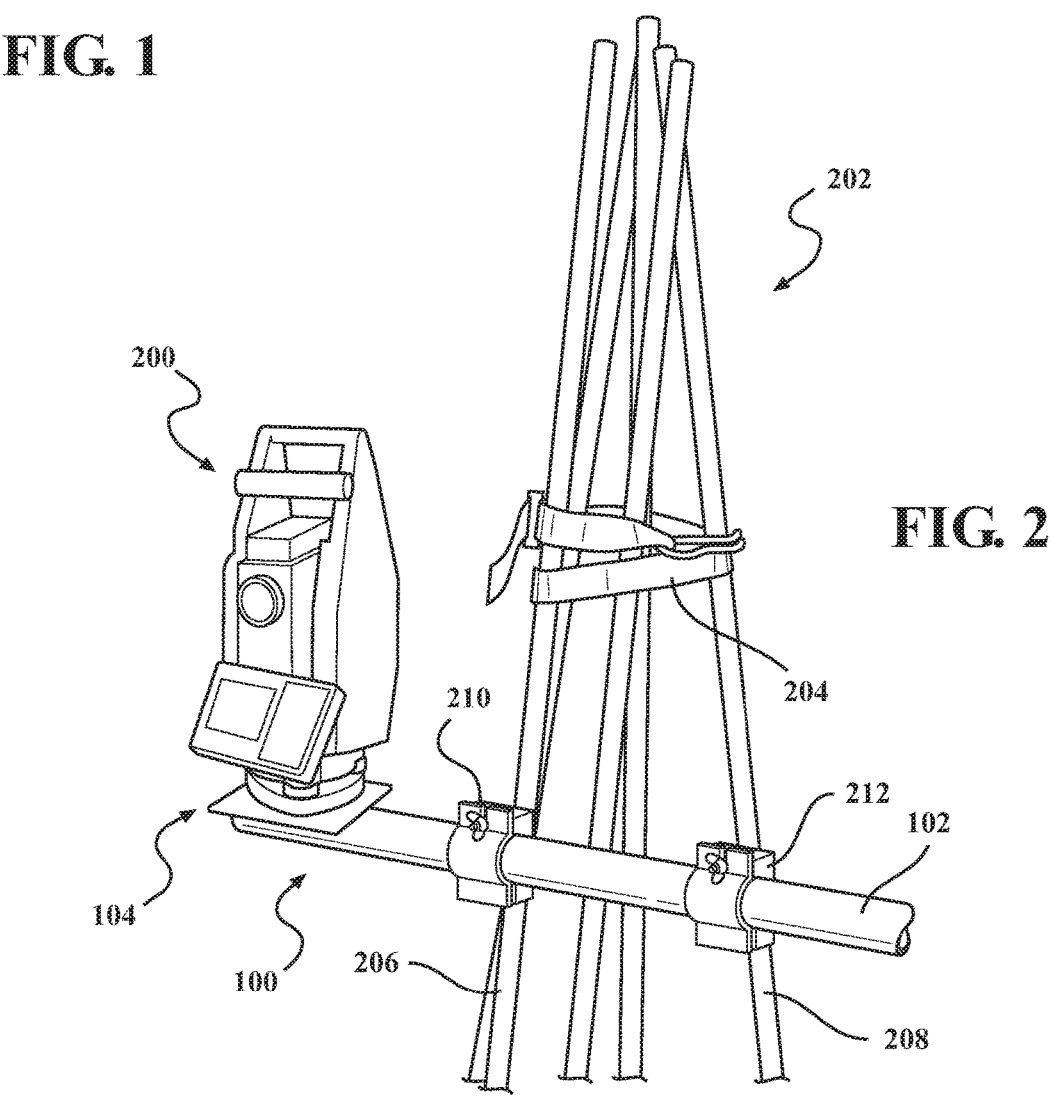
FIG. 2 shows the mounting arm of FIG. 1 secured to a group of reinforcing rods (re-rods or rebars)

FIG. 2 shows the rigid member 102 coupled to a group of rebars 202. The rods may be bent into a nest shape, and a tightening strap 204 may be used for such purpose. A surveying instrument 200 has been mounted to the arm 100 using tribrach mounting mechanism 104. The rigid member 102 is temporarily yet firmly coupled to rods 206, 208 through swivels clamps 210, 212.

Figure 3:
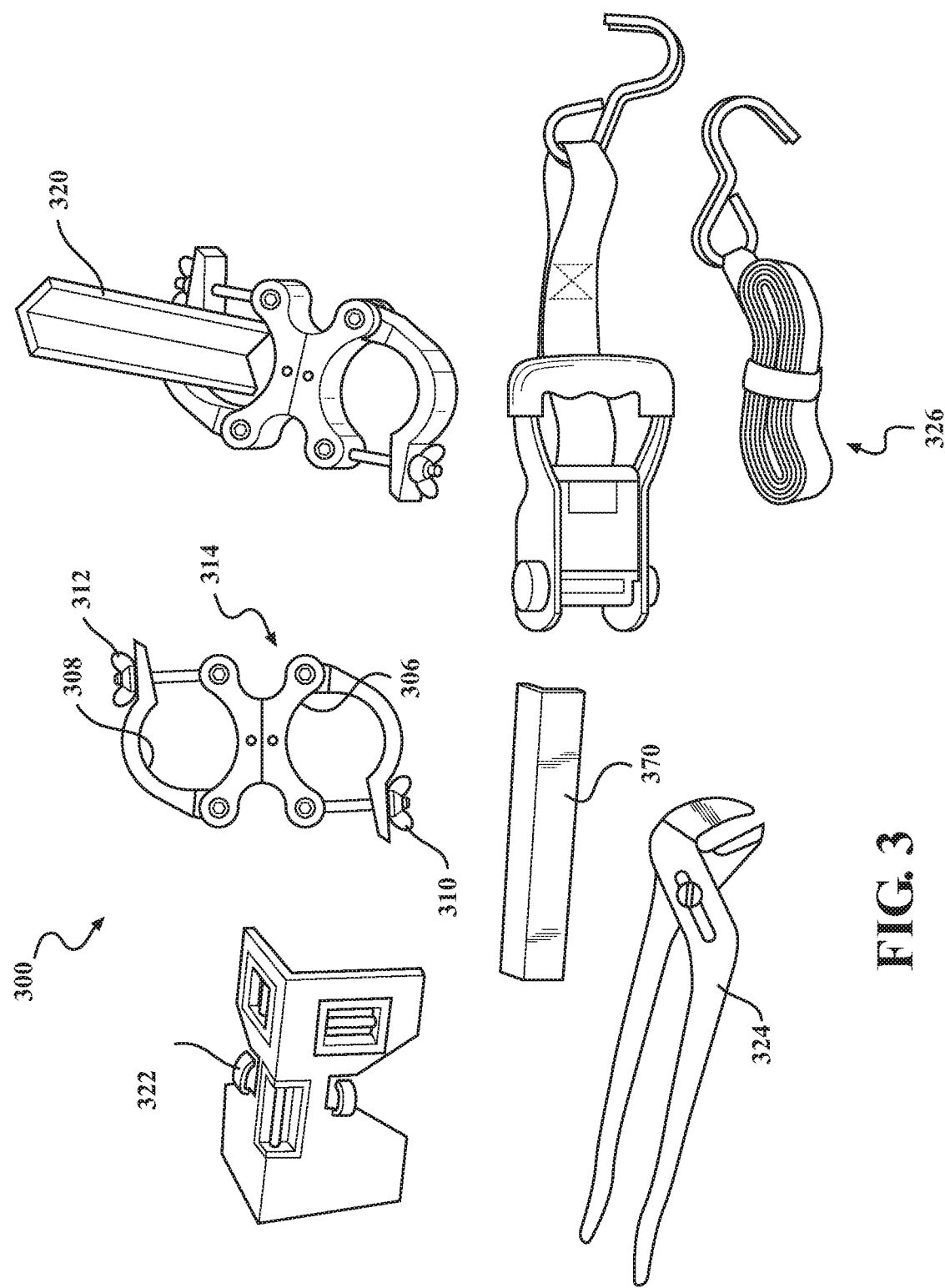
FIG. 3 illustrates a kit of parts applicable to re-rod mounting.

FIG. 3 illustrates components applicable to the mounting arrangement shown in FIG. 2. The two swivel clamps 300 are commercially available, and include two clamp portions 306, 308 that are independently tightened with separate thumbscrews 310, 312. One side of the clamp portion is used to tighten onto rigid member 102, whereas the other side is adapted to tighten onto a rebar (or other on-site member such as conduit, etc.) The invention is not limited in terms of rebar size, and will accommodate rebar sizes from #3 through #18, having nominal diameters in the range of 0.375 to 2.255 inches. A shim 320, 370 may be provided if one side of the clamp is too large to close around smaller diameter rebars.

The opposing clamp portions swivel with respect to one another at joint 314 which can be tightened with set screws after assuming a desired configuration. A strap may be included to form a group or rebars, and a post level 322, wrench 324 and/or ratchet tie-down strap 326 may be provided for adjustment and/or tightening. The basic kit would at least include the arm assembly 100 and at least the two swivel clamps 300.

Figure 4:
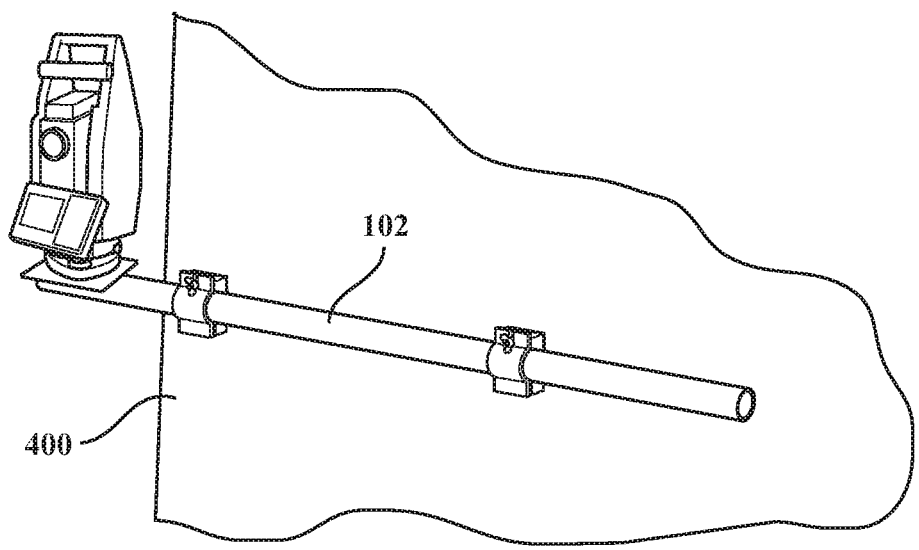
FIG. 4 shows the mounting arm fastened to a stable wall structure.
Figure 5:
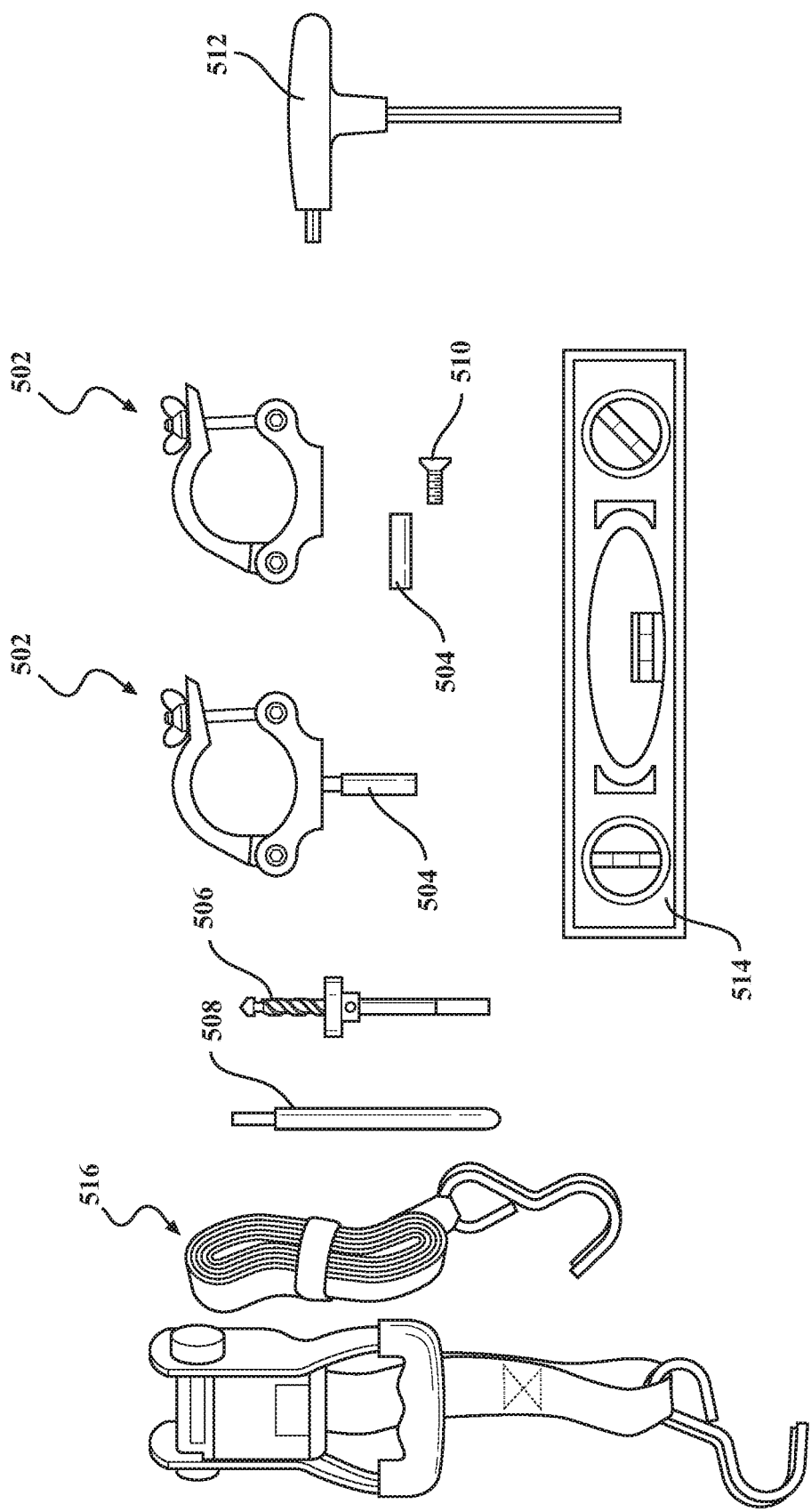
FIG. 5 illustrates a kit of parts applicable to wall mounting.

FIG. 4 illustrates another application of the invention, in this case a concrete, stone or masonry wall (400) mounting. The same rigid member 102 is used but with different fasteners, shown in FIG. 5. In particular, for wall-mounting, the kit includes a pair of rigid, tightenable clamps 502 adapted for wall mounting. For example, clamps 502 may use drop anchors 504. A hole is dried in the wall with bit 506, and the anchor is secured with drop anchor tool 508. The clamp is then fastened to the anchor with connecting bolt 510 that extends through the back portion of the anchor and tightened with wrench 512. The tools shown, including optional level 514 and ratcheting tie-down strap 516, may or may not be provided depending upon what the user already has. The basic kit for wall mounting would, however, include the arm assembly 100, at least two clamps 502, and suitable wall anchors.

Figure 6:
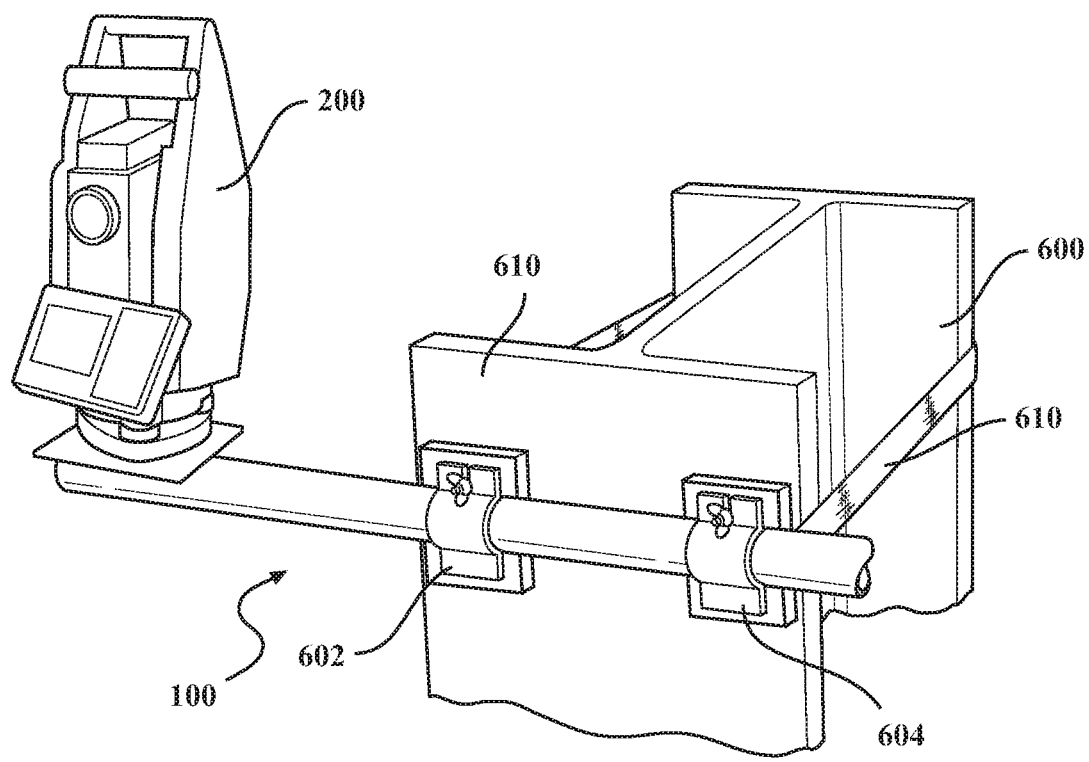
FIG. 6 shows the mounting arm of FIG. 1 secured to a vertical column structure such as an I-beam.
Figure 7:
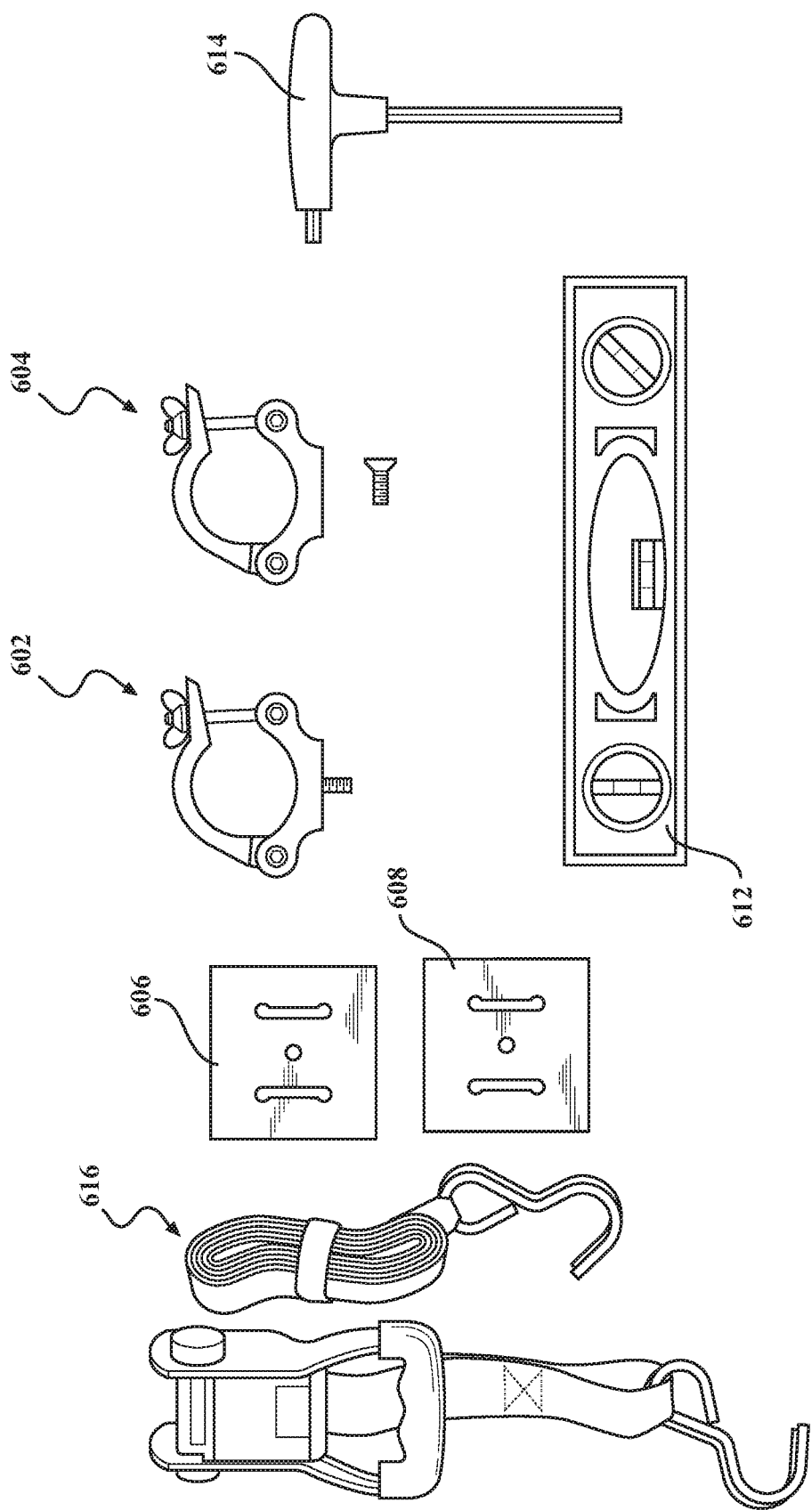
FIG. 7 depicts a kit of parts applicable to vertical column mounting.

FIG. 6 illustrates yet a further alternative embodiment of the invention adapted for mounting to a vertically oriented I-beam 600 or other columnar structure. In addition to arm assembly 100, the kit would include two clamps of the type shown in FIGS. 4, 5, but with different fasteners configured for attaching the clamps 602, 604 to brackets 606, 608. The brackets, which may be made of metal, wood or hard plastic, include opposing, vertically oriented slots through which a ratcheting tie-down strap 610 is threaded and tightened around the I-beam or column. FIG. 7 shows a kit applicable to the mounting arrangement of FIG. 6 which, again, may include optional tools such as level 612, wrench 614 and/or ratcheting tie-down strap 616.

The invention claimed is:

1. Apparatus securing a surveying instrument to an existing rigid, stable structure on a job site without a tripod, the apparatus comprising:

an arm assembly, the arm assembly including an elongated rigid member defining a longitudinal axis and first and second opposing ends defining a length;

a mounting mechanism attached to one of the opposing first and second ends of the arm assembly, the mounting mechanism being adapted to removably receive and secure a surveying instrument to the arm assembly;

wherein the mounting mechanism defines an instrument mounting axis, and wherein the instrument mounts to the mechanism with the axis being substantially perpendicular to the longitudinal axis of the elongated rigid member;

at least two clamps, each clamp having first and second portions, wherein the first portion of each clamp includes an adjustable jaw configured to tighten each clamp onto a different respective position along the elongated rigid member;

wherein the second portion of each clamp includes a device enabling the clamp to be rigidly fastened to an existing structure on a job site;

wherein the clamps secure the elongated rigid member in a horizontal orientation with the mounting mechanism facing upwardly to receive and secure the surveying instrument to the arm assembly; and wherein the surveying instrument is a total station, theodolite, laser or laser target.

2. The apparatus of claim 1, wherein the mounting mechanism includes a tribrach mount associated with the surveying instrument.

3. The apparatus of claim 1, wherein the second portion of each clamp includes a jaw configured to tighten onto an existing rebar.

4. The apparatus of claim 3, wherein the at least two clamps are swivel clamps enabling the angular orientation of the opposing jaws on each clamp to be adjusted and tightened into position.

5. The apparatus of claim 1, wherein the second portion of each clamp includes a masonry wall anchor.

6. The apparatus of claim 1, wherein:

the second portion of each clamp is coupled to a bracket; and a ratcheting strap configured to secure the brackets relative to an existing upright column structure.

7. The apparatus of claim 1, wherein the elongated rigid member is a hollow metal tube having width in the range of 1 to 2 inches and a length in the range of 2 to 5 feet.

* * * * *